US010340522B2

(12) United States Patent
Suh et al.

(10) Patent No.: US 10,340,522 B2
(45) Date of Patent: Jul. 2, 2019

(54) BINDER COMPOSITION FOR LITHIUM SECONDARY BATTERY, ELECTRODE FOR LITHIUM SECONDARY BATTERY INCLUDING THE BINDER COMPOSITION, AND LITHIUM SECONDARY BATTERY INCLUDING THE ELECTRODE

(71) Applicants: SAMSUNG SDI CO., LTD., Yongin-si, Gyeonggi-do (KR); Aekyung Chemical Co., Ltd., Seoul (KR)

(72) Inventors: Soonsung Suh, Yongin-si (KR); Seunguk Kwon, Yongin-si (KR); Jaehyuk Kim, Yongin-si (KR); Namseon Kim, Yongin-si (KR); Soojung Kim, Yongin-si (KR); Kwangshik Choi, Yongin-si (KR)

(73) Assignees: SAMSUNG SDI CO., LTD., Yongin-si, Gyeonggi-do (KR); Aekyung Chemical Co., Ltd., Seoul (KR)

( * ) Notice: Subject to any disclaimer, the term of this patent is extended or adjusted under 35 U.S.C. 154(b) by 166 days.

(21) Appl. No.: 15/648,646

(22) Filed: Jul. 13, 2017

(65) Prior Publication Data
US 2018/0034058 A1 Feb. 1, 2018

(30) Foreign Application Priority Data
Jul. 28, 2016 (KR) .................. 10-2016-0096126

(51) Int. Cl.
*H01M 4/62* (2006.01)
*C08F 220/56* (2006.01)
(Continued)

(52) U.S. Cl.
CPC .......... *H01M 4/622* (2013.01); *C08F 220/56* (2013.01); *C08L 1/286* (2013.01); *H01M 4/364* (2013.01);
(Continued)

(58) Field of Classification Search
CPC ....................... H01M 4/622; C08F 220/56
(Continued)

(56) References Cited

U.S. PATENT DOCUMENTS

2014/0154562 A1 6/2014 Fukuchi
2014/0335410 A1 11/2014 Loveridge et al.
(Continued)

FOREIGN PATENT DOCUMENTS

JP 5394719 B2 10/2013
KR 10-1354050 B1 1/2014
(Continued)

*Primary Examiner* — James M Erwin
(74) *Attorney, Agent, or Firm* — Lee & Morse, P.C.

(57) ABSTRACT

A binder composition for a lithium secondary battery, an electrode, and a lithium secondary battery, the binder composition including an interpenetrating network structure that includes a cyclic polymer, the cyclic polymer including a repeating unit represented by Formula 1 or a repeating unit represented by Formula 2; and a copolymer, the copolymer including a repeating unit represented by Formula 3 and a repeating unit represented by Formula 4, wherein an amount of the repeating unit represented by Formula 3 is about 40 mol % to about 70 mol %, based on a total amount of the copolymer:

Formula 1

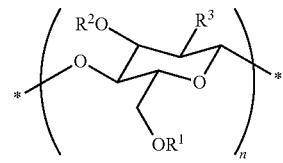

(Continued)

BINDER : INTERACTION WITH ACTIVE MATERIAL

-continued

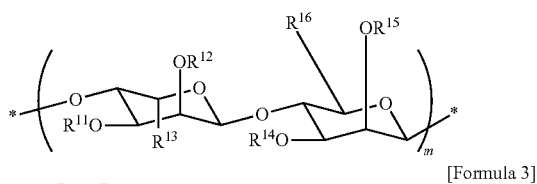

[Formula 2]

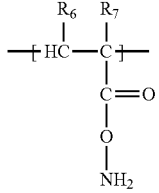

[Formula 3]

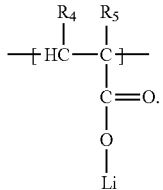

[Formula 4]

16 Claims, 4 Drawing Sheets

(51) Int. Cl.
    *C08L 1/28*     (2006.01)
    *H01M 4/36*     (2006.01)
    *H01M 4/38*     (2006.01)
    *H01M 4/48*     (2010.01)
    *H01M 10/0525*     (2010.01)
    *H01M 4/587*     (2010.01)

(52) U.S. Cl.
    CPC ............ *H01M 4/386* (2013.01); *H01M 4/483* (2013.01); *H01M 4/587* (2013.01); *H01M 10/0525* (2013.01); *Y02T 10/7011* (2013.01)

(58) Field of Classification Search
    USPC ........................................................ 429/213
    See application file for complete search history.

(56) References Cited

U.S. PATENT DOCUMENTS

| | | | |
|---|---|---|---|
| 2015/0010816 A1 | 1/2015 | Chung et al. | |
| 2015/0194655 A1* | 7/2015 | Toyoshima | H01M 4/131 429/338 |
| 2016/0164101 A1* | 6/2016 | Nagano | H01M 4/131 429/144 |

FOREIGN PATENT DOCUMENTS

| | | |
|---|---|---|
| KR | 10-2014-0071872 A | 6/2014 |
| KR | 10-2014-0096318 A | 8/2014 |
| KR | 10-2015-0006265 A | 1/2015 |

\* cited by examiner

BINDER COMPOSITION FOR LITHIUM SECONDARY BATTERY, ELECTRODE FOR LITHIUM SECONDARY BATTERY INCLUDING THE BINDER COMPOSITION, AND LITHIUM SECONDARY BATTERY INCLUDING THE ELECTRODE

CROSS-REFERENCE TO RELATED APPLICATION

Korean Patent Application No. 10-2016-0096126, filed on Jul. 28, 2016, in the Korean Intellectual Property Office, and entitled: "Binder Composition for Lithium Secondary Battery, Electrode for Lithium Secondary Battery Including the Binder Composition, and Lithium Secondary Battery Including the Electrode" is incorporated by reference herein in its entirety.

BACKGROUND

1. Field

Embodiments relate to a binder composition for a lithium secondary battery, an electrode for a lithium secondary battery including the binder composition, and a lithium secondary battery including the electrode.

2. Description of the Related Art

A lithium secondary battery may be used as a high-performance secondary battery having the highest energy density among commercially available secondary batteries in various fields such as in an electrical vehicle.

An oxide that has a structure capable of intercalating lithium and is formed of a lithium and a transition metal may be used as a cathode active material, and examples of the oxide may include $LiCoO_2$, $LiMn_2O_4$, and $LiNi_{1-x}Co_xO_2$ (where $0<x<1$).

A carbonaceous material in various forms such as artificial or natural graphite or hard carbon capable of intercalating/deintercalating lithium may be used as an anode of the lithium secondary battery.

SUMMARY

Embodiments are directed to a binder composition for a lithium secondary battery, an electrode for a lithium secondary battery including the binder composition, and a lithium secondary battery including the electrode.

The embodiments may be realized by providing a binder composition for a lithium secondary battery, the binder composition comprising an interpenetrating network structure that includes a cyclic polymer, the cyclic polymer including a repeating unit represented by Formula 1 or a repeating unit represented by Formula 2; and a copolymer, the copolymer including a repeating unit represented by Formula 3 and a repeating unit represented by Formula 4, wherein an amount of the repeating unit represented by Formula 3 is about 40 mol % to about 70 mol %, based on a total amount of the copolymer:

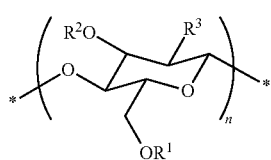

Formula 1

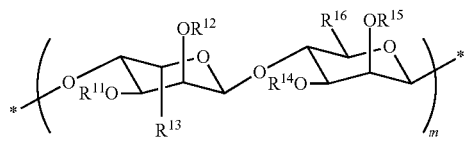

Formula 2 wherein, in Formulae 1 and 2, $R^1$, $R^2$, $R^{11}$, $R^{12}$, $R^{14}$, and $R^{15}$ are each independently a hydrogen atom, a substituted or unsubstituted C1-C5 alkyl group, a substituted or unsubstituted C2-C5 alkenyl group, a substituted or unsubstituted C2-C5 alkynyl group, or $-(CH_2)_p-COOX^1$, in which p is an integer of 1 to 5 and $X^1$ is an alkali metal, $R^3$, $R^{13}$, and $R^{16}$ are each independently $-OR^4$, $-NHR^5$, or $-COOX^2$, $R^4$ is a hydrogen atom, a substituted or unsubstituted C1-C5 alkyl group, a substituted or unsubstituted C2-C5 alkenyl group, a substituted or unsubstituted C2-C5 alkynyl group, or $-(CH_2)_p-COOX^1$, in which p is an integer of 1 to 5 and $X^1$ is an alkali metal, $R^5$ is a hydrogen atom or $-COCH_3$, $X^2$ is an alkali metal, and n and m are each independently an integer of 5 to 20,000,

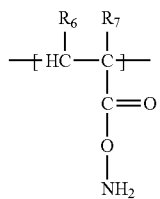

Formula 3 wherein, in Formula 3, $R^6$ and $R^7$ are each independently a hydrogen atom, a substituted or unsubstituted C1-C20 alkyl group, a substituted or unsubstituted C2-C5 alkenyl group, or a substituted or unsubstituted C2-C5 alkynyl group,

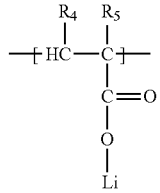

Formula 4 wherein, in Formula 4, $R_4$ and $R_5$ are each independently a hydrogen atom, a substituted or unsubstituted C1-C20 alkyl group, a substituted or unsubstituted C2-C5 alkenyl group, or a substituted or unsubstituted C2-C5 alkynyl group.

A molar ratio of the cyclic polymer and the copolymer may be about 1:9 to about 5:5.

The copolymer including the repeating unit represented by Formula 3 and the repeating unit represented by Formula 4 may be a copolymer represented by Formula 5:

Formula 5

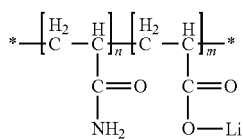

wherein, in Formula 5, n may be about 0.4 to about 0.7, and m may be about 0.3 to about 0.6.

The cyclic polymer may include a repeating unit represented by one of Formulae 3-1 to 3-6:

Formula 3-1
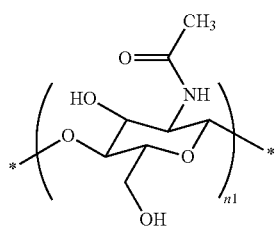

Formula 3-2
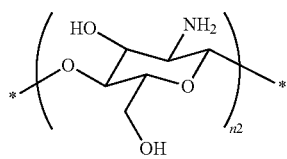

Formula 3-3
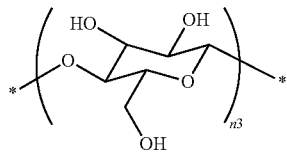

Formula 3-4
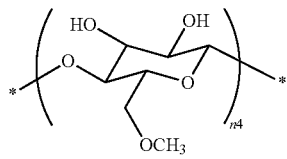

Formula 3-5
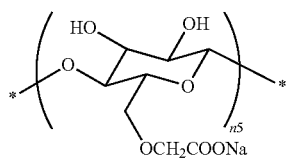

Formula 3-6
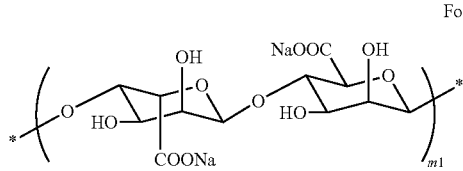

wherein, in Formulae 3-1 to 3-6, n1 to n5 and m1 may each independently be an integer of 5 to 20,000.

A weight average molecular weight of the copolymer may be about 700,000 g/mol to about 900,000 g/mol.

A weight average molecular weight of the cyclic polymer may be about 2,000 g/mol to about 2,000,000 g/mol.

A pH of the binder composition may be about 6.0 to about 8.0.

The embodiments may be realized by providing an electrode for a lithium secondary battery, the electrode including an electrode active material; and the binder composition according to an embodiment.

The electrode active material may include Si, $SiO_x$, in which $0<x<2$, a Si—C composite, a Si-Q alloy, in which Q is an alkali metal, an alkaline-earth metal, an element of Group 13 to Group 16, a transition metal, a rare-earth element, or a combination thereof, but not Si, graphite, or a combination thereof.

A molar ratio of the cyclic polymer and the copolymer may be about 1:9 to about 5:5.

The copolymer including the repeating unit represented by Formula 3 and the repeating unit represented by Formula 4 may be a copolymer represented by Formula 5:

Formula 5
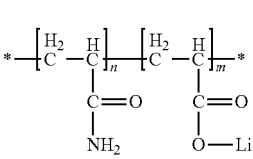

wherein, in Formula 5, n may be about 0.4 to about 0.7, and m may be about 0.3 to about 0.6.

The cyclic polymer may include a repeating unit represented by one of Formulae 3-1 to 3-6:

Formula 3-1
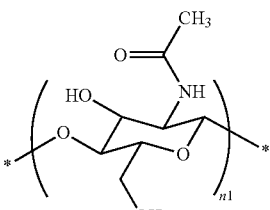

Formula 3-2
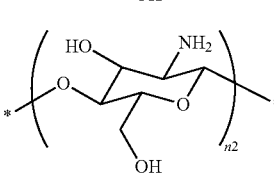

Formula 3-3
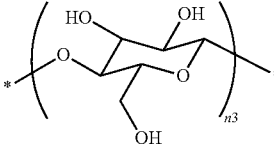

Formula 3-4
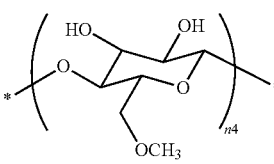

Formula 3-5
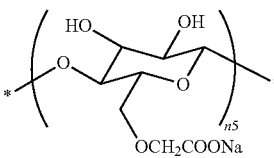

-continued

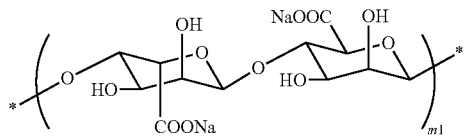

Formula 3-6 wherein, in Formulae 3-1 to 3-6, n1 to n5 and m1 may each independently be an integer of 5 to 20,000.

A weight average molecular weight of the copolymer may be about 700,000 g/mol to about 900,000 g/mol.

A weight average molecular weight of the cyclic polymer may be about 2,000 g/mol to about 2,000,000 g/mol.

A pH of the binder composition may be about 6.0 to about 8.0.

The embodiments may be realized by providing a lithium secondary battery including a cathode; an anode; and an electrolyte, wherein at least one of the cathode and the anode is the electrode according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
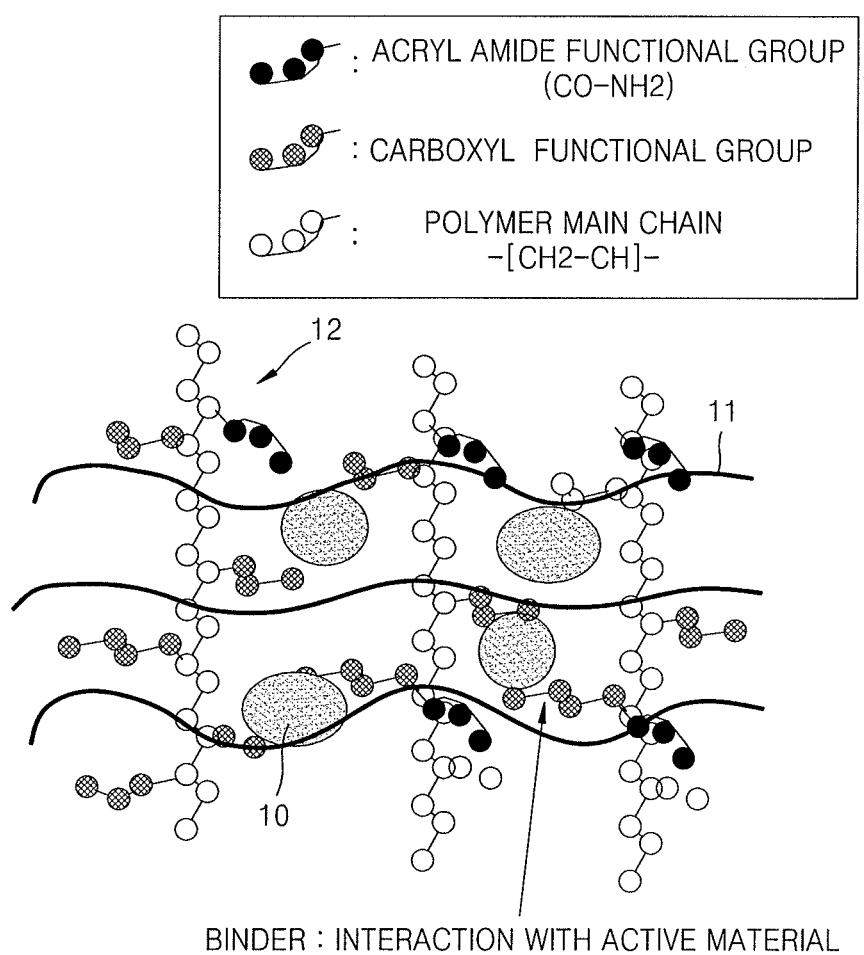
FIG. 1 illustrates an interaction between an electrode active material and a binder in an electrode formed by using a binder composition according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Reference will now be made in detail to embodiments of a binder composition for a lithium secondary battery, an electrode for a lithium secondary battery including the binder composition, and a lithium secondary battery including the electrode. In this regard, the present embodiments may have different forms and should not be construed as being limited to the descriptions set forth herein. Accordingly, the embodiments are merely described below, by referring to the figures, to explain aspects of the present description. As used herein, the terms "and/or" and "or" includes any and all combinations of one or more of the associated listed items. Expressions such as "at least one of," when preceding a list of elements, modify the entire list of elements and do not modify the individual elements of the list.

A silicon-based material has better capacity characteristics than those of a carbonaceous material. When the silicon-based material is used as an electrode active material, a volume of the electrode active material may increase as the number of charge/discharge cycles increases, and due to disconnection of a conducting pathway and an increase of side-reactions, a capacity of a lithium secondary battery including the silicon-based material may deteriorate. A binder composition according to an embodiment may help improve long-term lifespan characteristics of a silicon-based active material.

The binder composition may be an aqueous composition and may include an interpenetrating network structure that includes a cyclic polymer including a repeating unit represented by Formula 1 or a repeating unit represented by Formula 2; and a copolymer including a repeating unit represented by Formula 3 and a repeating unit represented by Formula 4. In an implementation, an amount of the repeating unit represented by Formula 3 may be about 40 mol % to about 70 mol %, based on the total amount of the copolymer.

Formula 1

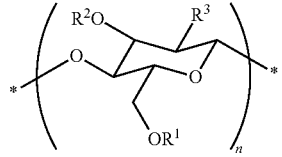

Formula 2

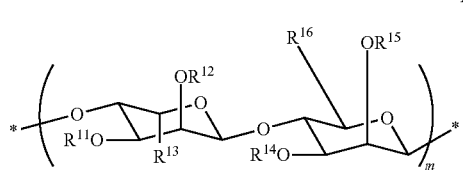

In Formulae 1 and 2, $R^1$, $R^2$, $R^{11}$, $R^{12}$, $R^{14}$, and $R^{15}$ may each independently be or include, e.g., a hydrogen atom, a substituted or unsubstituted C1-C5 alkyl group, a substituted or unsubstituted C2-C5 alkenyl group, a substituted or unsubstituted C2-C5 alkynyl group, or —$(CH_2)_p$—$COOX^1$ (in which p may be an integer of 1 to 5, and $X^1$ may be an alkali metal), $R^3$, $R^{13}$, and $R^{16}$ may each independently be or include, e.g., —$OR^4$, —$NHR^5$, or —$COOX^2$, $R^4$ is a hydrogen atom, a substituted or unsubstituted C1-C5 alkyl group, a substituted or unsubstituted C2-C5 alkenyl group, a substituted or unsubstituted C2-C5 alkynyl group, or —$(CH_2)_p$—$COOX^1$ (in which p may be an integer of 1 to 5, and $X^1$ may be an alkali metal), $R^5$ may be, e.g., a hydrogen atom or —$COCH_3$, $X^2$ may be, e.g., an alkali metal, and n and m may each independently be an integer of 5 to 20,000, e.g., an integer of 10 to 10,000.

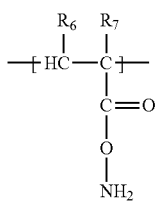

Formula 3

In Formula 3, $R^6$ and $R^7$ may each independently be or include, e.g., a hydrogen atom, a substituted or unsubstituted C1-C20 alkyl group, a substituted or unsubstituted C2-C5 alkenyl group, or a substituted or unsubstituted C2-C5 alkynyl group.

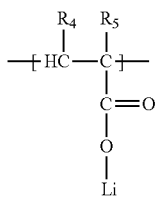

Formula 4

In Formula 4, $R_4$ and $R_5$ may each independently be or include, e.g., a hydrogen atom, a substituted or unsubstituted C1-C20 alkyl group, a substituted or unsubstituted C2-C5 alkenyl group, or a substituted or unsubstituted C2-C5 alkynyl group.

In an implementation, an amount of the repeating unit represented by Formula 3 may be about 40 mol % to about 70 mol %, or, for example, about 40 mol % to about 50 mol % based on the total amount of the copolymer.

When the binder composition according to an embodiment is used, a bond between a carboxyl group of the copolymer including the repeating unit represented by Formula 3 and the repeating unit represented by Formula 4; and an active material may be formed, which may thus help increase interaction between a binder and the active material in the electrode. As a result, a binding strength between the electrode plate and the active material and binding strength between the active materials may increase, and an expansion ratio may decrease due to the enforced binding strength. In addition, free lithium ion may exist in the copolymer, and an initial efficiency of the lithium secondary battery may improve when the binder composition including the copolymer is used. In addition, cohesion of components in the electrode may increase, and thus an initial electrode structure may be maintained (e.g., the same). Therefore, when the electrode is included, a lithium secondary battery having improved lifespan characteristics may be manufactured.

In the binder composition, a molar mixing ratio or molar ratio of the cyclic polymer and the copolymer may be about 1:9 to about 6:4, e.g., about 2:8 to about 5:5.

As used herein, the term "interpenetrating polymer network" denotes that two different polymer networks are combined to each other without being bonded by a covalent bond. An interpenetrating polymer network structure according to an embodiment may be a structure in which a network of the cyclic polymer and a network of the copolymer that are intertwined to or with each other and thus form another network or a structure in which a network of the cyclic polymer and a chain form of the copolymer that are intertwined to each other. In the interpenetrating polymer network structure, polymers of the networks may be linked as rings to each other, and thus the interpenetrating polymer network structure may have strong and durable characteristics, relative to those of another copolymer, while having excellent flexibility at the same time. In this regard, a binder composition including the interpenetrating polymer network structure may help effectively control expansion of an electrode active material, and excellent binding strength of the binder composition and excellent stability of an electrolyte may be secured. In addition, the binder composition according to an embodiment may be environment-friendly since an aqueous solvent may be used in preparation of an electrode. When the binder composition is used, a lithium secondary battery with improved capacity, initial efficiency, lifespan, and stability may be manufactured.

When the cyclic polymer including the repeating unit represented by Formula 1 or the repeating unit represented by Formula 2 is used, a tensile strength and an elastic strength of the electrode using the binder composition may increase as the interpenetrating polymer network structure is used as a binder. In this regard, expansion of an electrode active material, e.g., a silicon-based material, may be effectively controlled.

The cyclic polymer may include one a repeating unit represented by at least one of the following Formulae 3-1 to 3-6.

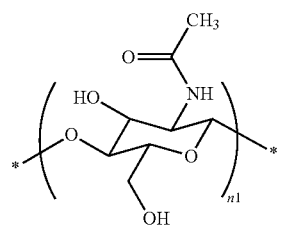

Formula 3-1

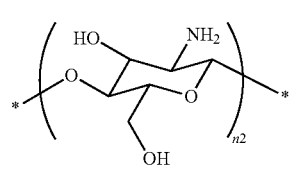

Formula 3-2

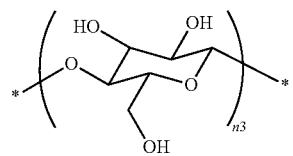

Formula 3-3

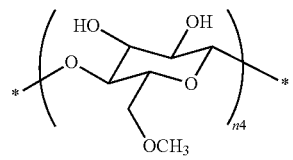

Formula 3-4

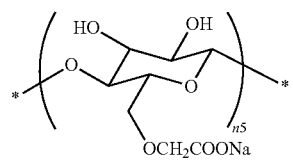

Formula 3-5

-continued

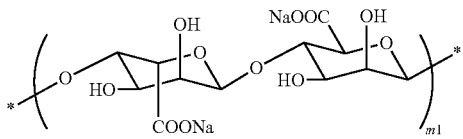

Formula 3-6

In Formulae 3-1 to 3-6, n1 to n5 and m1 may each independently be an integer of 5 to 20,000.

The repeating unit represented by Formula 1 may be derived from, e.g., chitin, chitosan, cellulose, methylcellulose, carboxymethyl cellulose, or starch. The repeating unit represented by Formula 2 may be derived from, e.g., sodium alginate.

A weight average molecular weight of the cyclic polymer may be about 2,000 g/mol to 2,000,000 g/mol, e.g., about 10,000 g/mol to about 1,000,000 g/mol. A weight average molecular weight of the copolymer may be about 400,000 g/mol to 1,000,000 g/mol, e.g., about 700,000 g/mol to about 900,000 g/mol.

When weight average molecular weights of the cyclic polymer and the copolymer are within these ranges, the copolymer and the interpenetrating polymer network structure may be effectively formed. When a molar ratio of the cyclic polymer and the copolymer is in a range of about 1:9 to about 6:4, e.g., about 20:80 to about 50:50, an interpenetrating polymer network structure may be formed. When a molar ratio of the cyclic polymer and the copolymer is within these ranges, excellent binding strength and flexibility may be secured, and the binder composition including the cyclic polymer and the copolymer may help effectively control expansion of the electrode active material.

A solvent may be an organic solvent or an aqueous solvent. The binder composition may be used with an aqueous solvent and may be environmental-friendly. A pH of the binder composition may be about 4 to about 11, e.g., about 6 to about 8. When a pH of the binder composition is within these ranges, a lithium secondary battery with improved lifespan characteristics may be manufactured. A viscosity of the binder composition may be about 10,000 cps to about 100,000 cps, e.g., about 10,000 cps to about 50,000 cps or about 10,000 cps to about 30,000 cps.

A method of preparing the binder composition according to an embodiment may be as follows.

A copolymer represented by Formula 5a, deionized water, and a cyclic polymer may be mixed, and a lithium hydroxide may be added and allowed to react to form, e.g., a poly (acrylamide-co-acrylic acid lithium). In an implementation, the reaction may be performed by heat-treatment at a temperature of about 20° C. to about 95° C., e.g., at about 70° C.

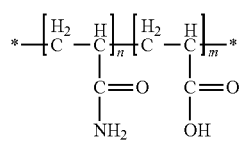

Formula 5a

In Formula 5a, n may be about 0.4 to about 0.7, e.g., about 0.4 to about 0.5; and m may be about 0.3 to about 0.6, e.g., about 0.5 to about 0.6.

An amount of the lithium hydroxide may be about 1.0 mol to about 1.1 mol, based on 1 mol of the copolymer represented by Formula 5a. A degree of reaction being performed as hydrogen of a carboxylic acid in the copolymer represented by Formula 5a is substituted with lithium by using the lithium hydroxide may be confirmed or observed by measuring a pH of the reaction mixture.

In the binder composition, an amount of the solvent may be about 400 parts to about 900 parts by weight, based on 100 parts by weight of the copolymer represented by Formula 5a. When an amount of the solvent is within this range, a viscosity of the solvent may be appropriate for coating. When the solvent is removed from the binder composition, an interpenetrating polymer network structure may be obtained. A process of removing water may refer to a process of drying by heat-treating at a temperature in a range of about 80° C. to about 100° C.

FIG. 1 illustrates interaction between an electrode active material and a binder in an electrode formed using a binder composition according to an embodiment.

Referring to FIG. 1, an electrode active material 10, a cyclic polymer 11, and a copolymer 12 in a binder composition may interact. As shown FIG. 1, the electrode active material 10 may interact with a carboxyl group of an acrylic acid and an acryl amide group of a copolymer 12, and the cyclic polymer 11.

As shown in FIG. 1, cohesion in an electrode may increase due to interaction between the electrode active material 10 and the binder of the binder composition. As a result, stability may improve by maintaining an electrode structure even when a charge/discharge process of a battery is repeated.

The cyclic polymer 11 may include, e.g., carboxymethyl cellulose (CMC).

According to another embodiment, an electrode for a lithium secondary battery may include a binder composition and an electrode active material.

The electrode active material may include, e.g., Si, $SiO_x$ (where $0<x<2$), a Si—C composite, a Si-Q alloy (where Q is an alkali metal, an alkaline-earth metal, an element of Group 13 to Group 16, a transition metal, a rare-earth element, or a combination thereof, but not Si), graphite, or a combination thereof.

The graphite may be formed of flake-like primary particles or spherical secondary particles, each formed by the flake-like primary particles assembled therein.

The Si—C composite may be a mixture of Si particle and graphite particles, a mixture of SiOx particles and graphite particles, or a mixture of Si-Q particles and graphite particles.

The anode may include a binder in addition to the electrode active material according to an embodiment.

The binder is an ingredient that may aid binding of an active material and a conductive agent and may aid binding to a current collector (e.g., in addition to the interpenetrating polymer network described above). The amount of the binder added may be, e.g., about 1 part to about 50 parts by weight, based on 100 parts by weight based on a total weight of the electrode active material (an anode active material). Examples of the binder may include polyvinylidene fluoride (PVDF), polyvinyl alcohol, carboxymethyl cellulose (CMC), starch, hydroxypropyl cellulose, reproduced cellulose, polyvinylpyrrolidone, tetrafluoroethylene, polyethylene, polypropylene, ethylene-propylene-diene terpolymer (EPDM), sulfonated EPDM, styrene-butylene rubber, fluorine rubber, and various copolymers.

For example, the amount of the (e.g., additional) binder may be from about 2 parts to about 5 parts by weight, based on 100 parts by weight of the total weight of the electrode active material (an anode active material). When the amount of the binder is within any of the above ranges, the binding force of the active material layer to the current collector may be satisfactory.

The anode may include a conductive agent.

The conductive agent may be a suitable conductive material that does not cause chemical change in the lithium secondary battery.

The amount of the conductive agent may be about 0.5 parts to about 5 parts by weight, e.g., about 0.01 part to about 2 parts by weight, based on 100 parts by weight of the total weight of the electrode active material (an anode active material).

When the amount of the conductive agent is within any of these ranges, the final anode may have good conductivity characteristics.

In an implementation, the conductive agent may include at least one carbonaceous conductive agent, e.g., carbon black, carbon fibers, or graphite. Examples of the carbon black may include acetylene black, Ketjen black, super P, channel black, furnace black, lamp black, or summer black. Examples of the graphite may include natural graphite or artificial graphite.

The anode may further include other conductive agents in addition to the carbonaceous conductive agent.

The other conductive agents may be selected from conductive fibers such as metal fibers; a metal powder such as a carbon fluoride powder, an aluminum powder, or a nickel powder; a conductive whisker such as zinc oxide or potassium titanate; a conductive metal oxide such as titanium oxide; and a polyphenylene derivative.

According to another embodiment, a lithium secondary battery includes the anode.

Hereinafter, the lithium secondary battery according to another embodiment will be described.

Figure 2:
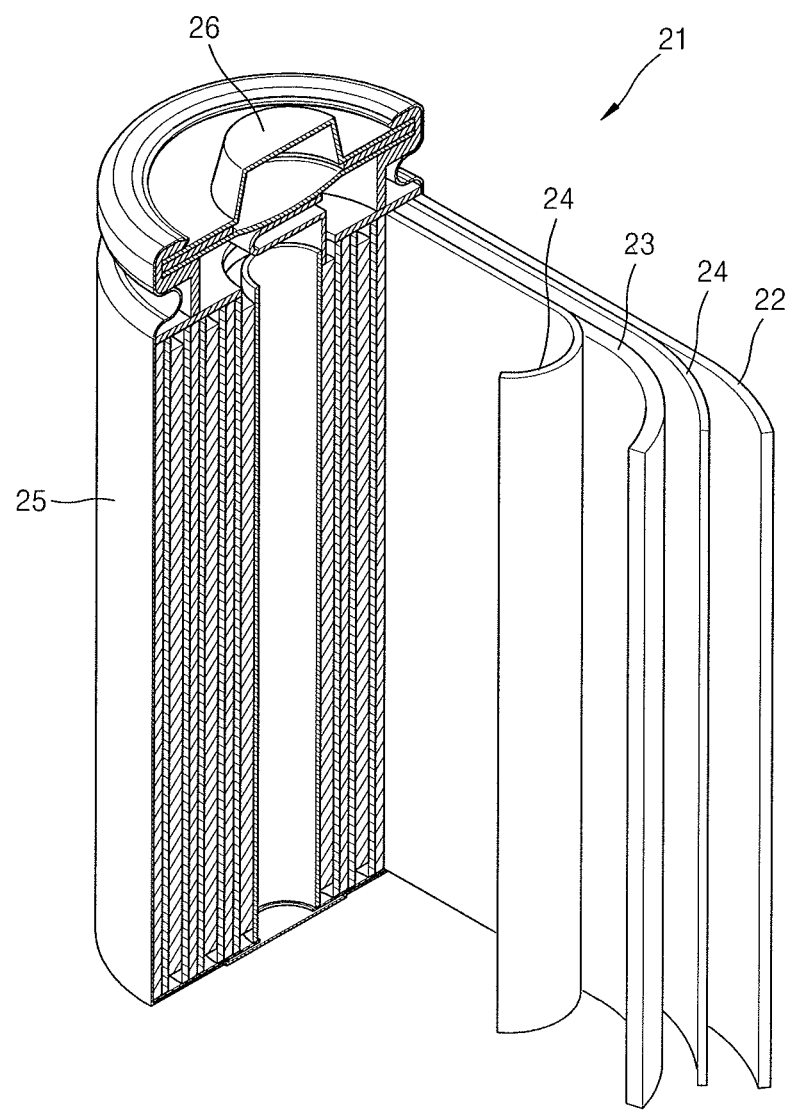
FIG. 2 illustrates a schematic view of a structure of a lithium secondary battery according to an embodiment.

As shown in FIG. 2, a lithium secondary battery 21 may include a cathode 23, an anode 22, and a separator 24. In an implementation, the cathode 23, the anode 22, and the separator 24 may be wound or folded, and then sealed in a battery case 25. In an implementation, the battery case 25 may be filled with an organic electrolytic solution and sealed with a cap assembly 26, thereby completing the manufacture of the lithium battery 21. In an implementation, the battery case 25 may be a cylindrical shape, a rectangular shape, or a thin-film shape. For example, the lithium battery 21 may be a thin-film battery. In an implementation, the lithium battery 21 may be a lithium ion battery.

In an implementation, the separator may be between the cathode and the anode to form a battery assembly. In an implementation, the battery assembly may be stacked in a bi-cell structure and impregnated with the electrolytic solution. In an implementation, the resultant assembly may be put into a pouch and hermetically sealed, thereby completing the manufacture of a lithium ion polymer battery.

In an implementation, a plurality of battery assemblies may be stacked to form a battery pack, which may be used in any device that requires high capacity and high output, e.g., in a laptop computer, a smart phone, or an electric vehicle.

The lithium battery may have improved lifetime characteristics and high rate characteristics, and thus may be used in an electric vehicle (EV), e.g., in a hybrid vehicle such as a plug-in hybrid electric vehicle (PHEV). The lithium battery may be applicable to the high-power storage field. For example, the lithium battery may be used in an electric bicycle or a power tool.

The lithium secondary battery according to any one of the above-described embodiments may have improved capacity and improved lifetime characteristics, and thus, may be used in a battery cell for use as a power source of a small device, and may also be used as a unit battery of a medium-large size battery pack or battery module including a plurality of battery cells for use as a power source of a medium-large size device. Also, the lithium secondary battery according to any one of the above-described embodiments may have a high voltage, a high capacity, and a high energy density and thus may be widely used in various fields such as in mobile phones, laptop computers, storage batteries of wind- or solar-powered energy generating systems, electric vehicles, uninterruptible power supplies, and storage batteries for home use.

The anode may include a current collector and an anode active material layer formed thereon.

A loading level at the anode may be about 4 mg/cm$^2$ to about 6.5 mg/cm$^2$, e.g., about 5.5 mg/cm$^2$. A mixture density of the anode active material layer may be about 1 g/cc to about 2.5 g/cc, e.g., about 1.5 g/cc.

For example, the anode may be prepared in the following manner.

For example, an anode active material according to an embodiment, a binder, and a solvent may be mixed to prepare a composition for forming an anode active material layer.

The binder may be the binder composition according to an embodiment. In an implementation, another suitable binder may be included.

Examples of the additional binder may include polymers including polyvinyl alcohol, carboxymethyl cellulose, hydroxypropyl cellulose, polyvinylchloride, carboxylated polyvinylchloride, polyvinyl fluoride, and ethylene oxide; polyvinylpyrollidone, polyurethane, polytetrafluoroethylene, polyethylene, styrene-butadiene rubber, acrylated styrene-butadiene rubber, epoxy resin, and nylon.

In an implementation, the composition for forming an anode active material layer may include at least one conductive agent that is selected from carbonaceous conductive agents and those conductive agents described above.

In preparation of the composition for forming an anode active material layer, a suitable anode active material may be further added.

Examples of the suitable anode active material may include graphite capable of intercalating and deintercalating lithium ions, a carbonaceous material such as carbon, a lithium metal or an alloy thereof, and a silicon-oxide-based material.

Next, the composition for forming an anode active material layer may be coated and dried on an anode current collector to prepare an anode.

The anode current collector may have a thickness of about 3 to 500 μm. In an implementation, a material may be used as long as it has suitable conductivity and does not cause a chemical change in the fabricated battery. Examples of the anode current collector may include copper, stainless steel, aluminum, nickel, titanium, sintered carbon, copper or stainless steel having a surface treated with carbon, nickel, titanium, or silver, and aluminum-cadmium alloys. In an implementation, the anode current collector may be processed to have fine irregularities on the surface so as to enhance adhesive strength to the electrode active material. In an implementation, the anode current collector may be fabricated in various forms including films, sheets, foils, nets, porous structures, foams, and non-woven fabrics.

Examples of the solvent may include N-methylpyrrolidone (NMP), acetone, water, and a mixture thereof. An amount of the solvent may be about 1 part to about 50 parts by weight, based on 100 parts by weight of the anode active material. When the amount of the solvent is within this range, the active material layer may be easily formed.

According to another embodiment, provided is a lithium secondary battery including the anode. A method of preparing the lithium secondary battery according to another embodiment will be described as follows.

A cathode may be prepared in the same manner as the anode is prepared.

The cathode may be prepared by coating and drying a composition for forming a cathode active material layer on a current collector in the same manner as the anode is prepared.

The composition for forming a cathode active material layer may be prepared by mixing a cathode active material, a conductive agent, a binder, and a solvent.

A suitable cathode active material in a lithium battery may be used as the cathode active material.

The suitable cathode active material may include at least one selected from lithium cobalt oxide, lithium nickel cobalt manganese oxide, lithium nickel cobalt aluminum oxide, lithium iron phosphate, and lithium manganese oxide, but is not limited thereto. A suitable cathode active material may be used.

For example, the cathode active material may be a compound represented by one of the following formulae: $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A may be nickel (Ni), cobalt (Co), manganese (Mn), or any combination thereof; B' may be aluminum (Al), nickel (Ni), cobalt (Co), manganese (Mn), chromium (Cr), iron (Fe), magnesium (Mg), strontium (Sr), vanadium (V), a rare earth element, or any combination thereof; D' may be oxygen (O), fluorine (F), sulfur (S), phosphorus (P), or any combination thereof; E may be cobalt (Co), manganese (Mn), or any combination thereof; F' may be fluorine (F), sulfur (S), phosphorus (P), or any combination thereof; G may be aluminum (Al), chromium (Cr), manganese (Mn), iron (Fe), magnesium (Mg), lanthanum (La), cerium (Ce), strontium (Sr), vanadium (V), or any combination thereof; Q may be titanium (Ti), molybdenum (Mo), manganese (Mn), or any combination thereof; I' may be chromium (Cr), vanadium (V), iron (Fe), scandium (Sc), yttrium (Y), or any combination thereof; and J may be vanadium (V), chromium (Cr), manganese (Mn), cobalt (Co), nickel (Ni), copper (Cu), or any combination thereof.

The types and amounts of the conductive agent, the binder, and the solvent may be the same as those used in the preparation of the anode.

The binder may be the binder composition according to an embodiment and/or a suitable binder as that used in the preparation of the anode.

For example, the cathode active material may be at least one selected from $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=11$), $LiNi_{1-y}Co_yO_2$, $LiCo_{1-y}Mn_yO_2$, $LiNi_{1-y}Mn_yO_2$ (where $0 \leq Y < 1$), $LiMn_{2-z}Ni_zO_4$, $LiMn_{2-z}Co_zO_4$ (where $0<Z<2$), $LiCoPO_4$, and $LiFePO_4$.

The cathode current collector may have a thickness of about 3 to 500 μm. In an implementation, a suitable material may be used as long as it has suitable conductivity and does not cause a chemical change in the fabricated battery. Examples of the cathode current collector may include stainless steel, aluminum, nickel, titanium, sintered carbon, aluminum or stainless steel having a surface treated with carbon, nickel, titanium, or silver. In an implementation, the cathode current collector may be processed to have fine irregularities on the surface so as to enhance adhesive strength to the electrode active material. In an implementation, the cathode current collector may be fabricated in various forms including films, sheets, foils, nets, porous structures, foams, and non-woven fabrics.

A separator may be disposed between the cathode and the anode prepared as described above, and an organic electrolyte solution may be provided thereto, thereby manufacturing a lithium secondary battery.

In an implementation, the anode, the separator, and the cathode may be stacked in this stated order, and the stack may be wound or folded in a cylindrical or box-shaped battery case or pouch, and an organic electrolyte solution may be injected to the battery case or pouch to manufacture a lithium secondary battery.

The separator may be disposed between the cathode and the anode and may be an insulating thin film having high ion permeability and mechanical strength.

For example, the separator may be an insulating thin film having high ion permeability and strong mechanical strength. The separator may have a pore diameter of about 0.01 μm to about 10 μm, and a thickness of about 5 μm to about 20 μm. Examples of the separator may include olefin-based polymers, such as polypropylene, and sheets or non-woven fabric made of glass fiber or polyethylene. When a lithium metal battery includes a solid polymer electrolyte, the solid polymer electrolyte may also serve as the separator.

The separator may be a multilayer including at least two layers of polyethylene, polypropylene, polyvinylidene fluoride, or any combinations thereof. The multilayer may be a mixed multilayer. For example, the separator may be a two-layered separator including polyethylene and polypropylene layers, a three-layered separator including polyethylene, polypropylene, and polyethylene layers, or a three-layered separator including polypropylene, polyethylene, and polypropylene layers.

The separator may have a coating layer including an inorganic material on at least one surface thereof.

In the inorganic coating layer, an inorganic material and a filler may exist as those are mixed in one layer or may each exist in different layers.

The inorganic material may exist as an inorganic oxide, and the inorganic oxide may have a particle diameter of about 0.1 μm to about 5 μm to form a coating layer with an even thickness.

The inorganic material may include at least one element selected from Si, Al, Ti, Zn, Mg, and Mn, and the inorganic oxide may be at least one inorganic oxide selected from $SiO_2$, $Al_2O_3$, $Al(OH)_3$, $AlO(OH)$, $TiO_2$, $BaTiO_3$, $ZnO_2$, and $Mg(OH)_2$.

A thickness of the inorganic coating layer may be in a range of about 0.2 μm to about 6 μm.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte.

The non-aqueous liquid electrolyte may include an organic solvent. The organic solvent may be a suitable organic. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl iso-propyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethyl formamide, N,N-dimethyl acetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

Examples of the organic solid electrolyte may include polyethylene derivatives, polyethylene oxide derivatives, polypropylene oxide derivatives, a phosphoric acid ester polymer, a poly agitation lysine, a polyester sulfide, polyvinyl alcohol, polyfluoride vinylidene, and polymers including ionic dissociative groups.

Examples of the inorganic solid electrolyte may include a nitride, a halide, or a sulfate of lithium such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be a material that may easily dissolve in the non-aqueous electrolyte, and examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, LiI, or any combination thereof. To help improve charge-discharge characteristics and flame resistance in the lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the non-aqueous electrolyte. In some embodiments, to provide non-flammable characteristics, a halogen-containing solvent such as carbon tetrachloride, ethylene trifluoride, or the like may be further added to the non-aqueous electrolyte, if desired.

The lithium secondary battery according to another embodiment may use an organic solid electrolyte and/or an inorganic solid electrolyte in addition to the separator. Here, when the organic solid electrolyte and/or the inorganic solid electrolyte is used, the solid electrolyte may also serve as a separator in some cases, and thus the separator described above may not be used.

Examples of the organic solid electrolyte may include polyethylene derivatives, polyethylene oxide derivatives, polypropylene oxide derivatives, a phosphoric acid ester polymer, a polyester sulfide, polyvinyl alcohol, and polyfluoride vinylidene.

Examples of the inorganic solid electrolyte may include a nitride, a halide, or a sulfate of lithium such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

Examples of the medium-large size device may include electric vehicles (EVs), including hybrid electric vehicles (HEVs), plug-in hybrid electric vehicles (PHEVs), electric bicycles (E-bikes), and electric scooters (E-scooters); electric bicycles; power tools; and electricity storage devices.

Hereinafter are definitions of functional groups and substituents used in the chemical formulae herein.

As used herein, the term "substituted" may be used to described that at least one hydrogen in a compound is substituted with a halide group, a C1-C30 alkoxy group, a C2-C30 alkoxyalkyl group, a hydroxyl group, a nitro group, a cyano group, an amino group, an amidino group, a hydrazine group, a hydrazone group, a carboxylic acid or a salt thereof, a sulfonyl group, a sulfamoyl group, a sulfonic acid or a salt thereof, a phosphoric acid or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C2-C30 heteroaryl group, a C3-C30 heteroarylalkyl group, a C2-C30 heteroaryloxy group, a C3-C30 heteroaryloxyalkyl group, or a C6-C30 heteroarylalkyloxy group.

As used herein, the term "hetero" refers to an atom that is selected from N, O, S, and P.

The term "alkyl" used in a chemical formula refers to a fully saturated branched or unbranched (or straight chain or linear) hydrocarbon.

Examples of the "alkyl" include methyl, ethyl, n-propyl, iso-propyl, n-butyl, iso-butyl, sec-butyl, n-pentyl, iso-pentyl, neopentyl, iso-amyl, n-hexyl, 3-methylhexyl, 2,2-dimethylpentyl, 2,3-dimethyl pentyl, n-heptyl, etc.

At least one hydrogen atom in the "alkyl" may be substituted with a halogen atom, a C1-C20 alkyl group (e.g., $CCF_3$, $CHCF_2$, $CH_2F$, or $CCl_3$) substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxylic acid or a salt thereof, a sulfonyl group, a sulfamoyl group, a sulfonic acid or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" includes fluorine, bromine, chlorine, and iodine atoms.

The term "alkenyl" used in a chemical formula refers to a branched or non-branched hydrocarbon having at least one carbon-carbon double bond, and the term "alkynyl" used in a chemical formula refers to a branched or non-branched hydrocarbon having at least one carbon-carbon triple bond.

The term "aryl" used in a chemical formula refers to an aromatic hydrocarbon that may be used alone or in a combination and includes at least one ring.

The term "aryl" includes a group wherein aromatic rings are fused together with one or more cycloalkyl rings.

Examples of the aryl include phenyl, naphthyl, and tetrahydronaphthyl.

Also, at least one hydrogen atom in the aryl group may be substituted with a substituent selected from the same substituent groups as described above in connection with the alkyl group.

As used herein, the term "copolymer" may refer to a block copolymer, a random copolymer, a graft copolymer, or an alternating copolymer.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of Binder Composition 280 g of deionized water and 20 g of sodium carboxymethyl cellulose (CMC) (having a weight average molecular weight of 250,000 g/mol) were added to a 2-L reaction container equipped with a heater, a cooler, and a stirrer, and the reaction container was heated to a temperature of 80° C. and maintained for 2 hours under a nitrogen atmosphere. A solution prepared by dissolving 0.2 g of ammonium persulfate in 20 g of deionized water was added thereto, and the resultant was maintained for 20 minutes. Then, an aqueous mixture solution including 90 g of acrylamide and 90 g of acrylic acid in 256 g of deionized water was added dropwise thereto for 3 hours. Next, a reaction in the reaction container was allowed to continue for 1 hour, and the resultant was cooled to a temperature of about 40° C. or lower to prepare poly(acrylamide-co-acrylic acid) represented by Formula 5a. An aqueous solution prepared by dissolving 32 g of lithium hydroxide in 380 g of deionized water was added dropwise thereto for 10 minutes, and the resultant was maintained for 30 minutes to prepare poly(acrylamide-co-acrylic acid lithium) represented by Formula 5.

In the poly(acrylamide-co-acrylic acid) represented by Formula 5a, a molar ratio of acrylamide and acrylic acid was 5:5, and a weight average molecular weight (Mw) was about 750,000.

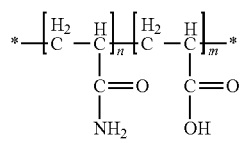

Formula 5a

In Formula 5a, m and n denote a mole fraction, and a sum of m and n is 1. n was 0.5 and m was 0.5.

The poly(acrylamide-co-acrylic acid lithium) represented by Formula 5 and a cyclic polymer including a repeating unit represented by Formula 3-6 were mixed at a molar ratio of 25:75 to prepare an interpenetrating polymer network structure. In the poly(acrylamide-co-acrylic acid lithium), a molar ratio of acrylamide and acrylic acid was 5:5, and a weight average molecular weight (Mw) of the poly(acrylamide-co-acrylic acid lithium) was about 750,000. The cyclic polymer had a weight average molecular weight of about 250,000.

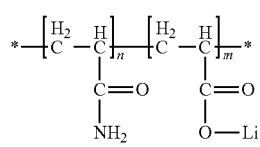

Formula 5

In Formula 5, m and n denote a mole fraction, and a sum of m and n is 1. n was 0.5 and m was 0.5.

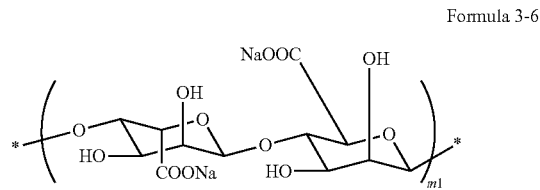

Formula 3-6

In Formula 3-6, ml was 25.

In the binder composition, a solid content was about 18 wt %, a pH was about 8.0, and a viscosity was about 5,000 cps.

Example 2: Preparation of Binder Composition

A binder composition was prepared in the same manner as in Example 1, except that a molar ratio of acrylamide and acrylic acid in the poly(acrylamide-co-acrylic acid) represented by Formula 5a was changed to 4:6 instead of 5:5.

A solid content of the binder composition was about 18 wt %, a pH was about 8.1, and a viscosity was about 6,500 cps.

Example 3: Preparation of Binder Composition

A binder composition was prepared in the same manner as in Example 1, except that a molar ratio of acrylamide and acrylic acid in the poly(acrylamide-co-acrylic acid) represented by Formula 5a was changed to 7:3 instead of 1:1.

A solid content of the binder composition was about 18 wt %, a pH was about 8.0, and a viscosity was about 15,000 cps.

Example 4: Preparation of Half-Cell and Full-Cell 58.5 wt % of a silicon compound (a Si—Ti—Ni alloy, available from MKE electronics), 22.0 wt % of first graphite (MC20, available from Mitsubishi chemical), 9.5 wt % of second graphite (Timrex SFG6, available from Timcal), 2 wt % of ketjen black (KB603, available from LION), and 8 wt % of the binder composition prepared in Example 1 were added to water, and thus a slurry for forming an anode active material layer was prepared.

The slurry was coated and dried on a copper foil, and the resultant was roll-pressed to prepare an anode. Here, a loading level of the anode was about 5.5 mg/cm², and a mixture density of the anode was about 1.5 g/cc.

A counter electrode of the anode was a lithium metal having a thickness of about 100 μm.

An electrolyte was prepared by adding $LiPF_6$ into a mixed solvent including ethylene carbonate (EC), diethyl carbonate (DEC), and fluoroethylene carbonate (FEC) at a volume ratio of 5:70:25 to prepare a 1.5 M solution. The anode, the counter electrode, and the electrolyte were used to prepare a half-cell.

$LiNi_{0.6}Co_{0.2}Mn_{0.2}O_2$, ketjen black, and polyvinylidene fluoride at a weight ratio of 94:3:3 were added to a NMP solvent to prepare a slurry. The slurry was coated and dried on an aluminum foil, and the resultant was roll-pressed to prepare a cathode.

The anode and the electrolyte prepared in the half-cell, the cathode, and a polypropylene separator were used to manufacture a full-cell.

Comparative Example 1: Manufacture of Half-Cell and Full-Cell

An anode, a half-cell, and a full-cell were prepared in the same manner as in Example 3, except that 8 wt % of a polyvinylidene fluoride binder solution (with a NMP solvent) was used instead of the binder composition of Example 1.

Comparative Example 2: Preparation of Binder Composition

A binder composition was prepared in the same manner as in Example 1, except that an amount of LiOH was 48 g so that a pH of the binder composition was 11 in the preparation of the binder composition.

Comparative Example 3: Preparation of Half-Cell and Full-Cell

A half-cell and a full-cell were prepared in the same manner as in Example 4, except that the binder composition prepared in Comparative Example 2 was used instead of the binder composition of Example 1.

Evaluation Example 1: Test of Binding Force Between Binder and Active Material The anode plate was scratched off from the half-cell prepared in Example 2 and then was washed 3 times with water at 600 rpm for 30 minutes to evaluated a weight change. When the aqueous binder was not bonded to the active material, the binder was washed out by water during the washing process, whereas when the binder was bonded to the active material, the binder remained on a surface of the active material after the washing process, and thus a binding force between the binder and the active material would be measured.

Figure 3:
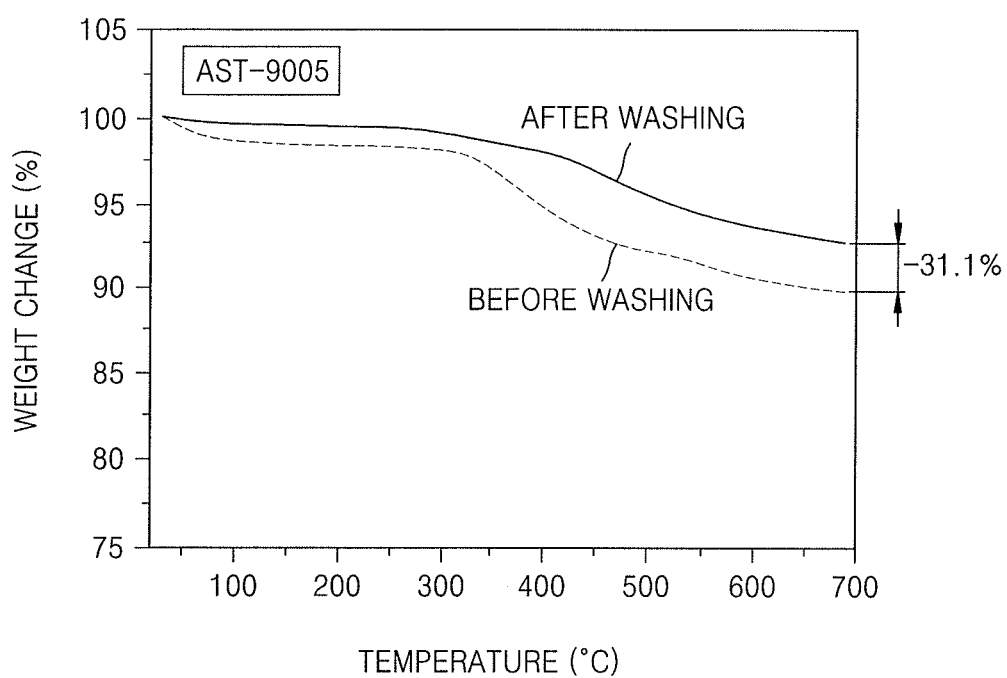
FIG. 3 illustrates a weight change of an anode of a half-cell battery prepared according to Example 4 after washing an anode.

The results of the weight change are shown in FIG. 3.

Referring to FIG. 3, the anode prepared in Example 4 had a weight loss of about 31.1% after the washing process compared to that before the washing process. In this regard, since the weight loss was observed, 68.9% of the binder composition remained in the electrode, and thus it may be seen that a binding force between the electrode active material and the binder had improved.

Evaluation Example 2: X-Ray Photoelectron Spectroscopy (XPS)

The anode prepared in Example 2 was washed with water, and XPS analysis was performed on states before and after washing the anode with water. The results of the XPS analysis are shown in FIG. 4.

Figure 4:
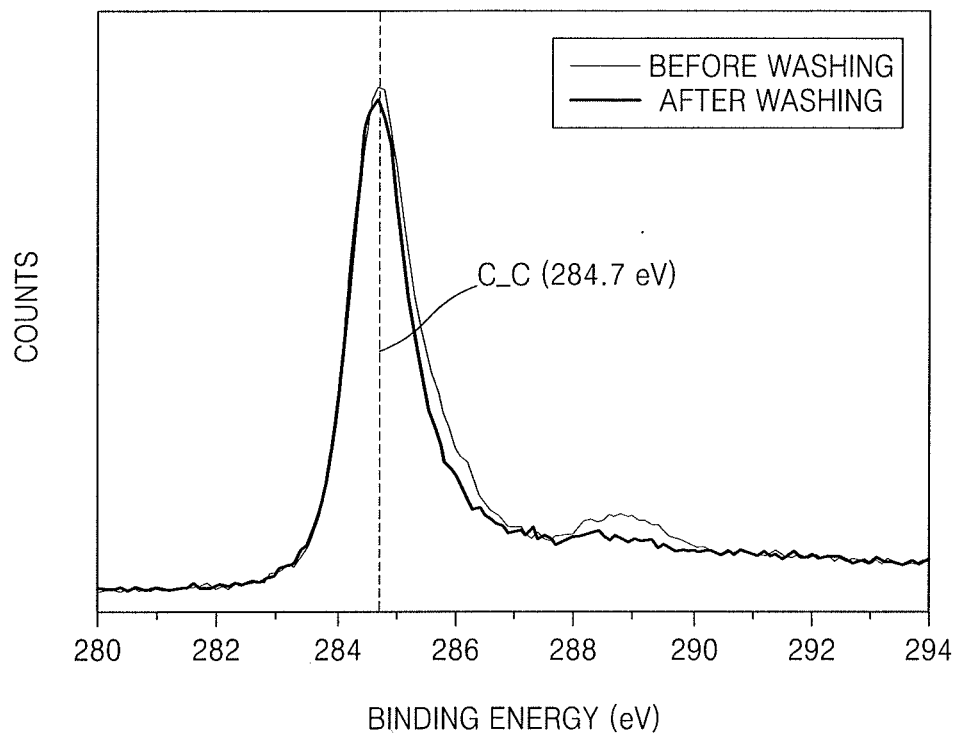
FIG. 4 illustrates the results of an X-ray photoelectron spectroscopic analysis of states of the anode prepared in Example 4 before and after washing with water.

Referring to FIG. 4, a C1s integration value had almost no difference between before and after the washing process. In this regard, a binding force between the anode active material and the binder was confirmed as good.

Evaluation Example 3: Adhesion of Electrode Plate

In order to evaluate adhesion of the anode of Example 2 and the anode of Comparative Example 1, the anodes were each prepared as a sample having a size of 10 mm×25 mm, fixed on a glass plate, and an end of the sample was mounted in a jig. The other end of the sample was lifted 15 mm at a rate of 100 mm/min to measure the adhesion by using a peel-off method. The results of the measurement are shown in Table 1.

TABLE 1

| Sample | Adhesion (gf/mm) |
| --- | --- |
| Example 2 | 1.64 |
| Comparative Example 1 | 0.5 |

Referring to Table 1, it may be seen that the anode of Example 2 had an improved adhesion compared with that of the anode of Comparative Example 1.

Evaluation Example 4: Cohesion of Electrode Plate

In order to evaluate cohesion of the anode of Example 4 and the anode of Comparative Example 1, the anodes were each prepared as a sample having a size of 10 mm×25 mm, and the cohesions of the anodes were measured. The results of the measurement are shown in Table 2.

TABLE 2

| Sample | Cohesion (g) |
| --- | --- |
| Example 4 | 51 |
| Comparative Example 1 | 28 |

Referring to Table 2, it may be seen that the anode of Example 4 had an improved cohesion compared with that of the anode of Comparative Example 1.

Evaluation Example 5: Initial Efficiency

Charge capacities and discharge capacities of the half-cells prepared in Example 4 and Comparative Example 1 that appeared after a charging/discharging process at a 0.1 C rate were measured, and the results of the initial efficiencies are shown in Table 3. The initial efficiency in Table 3 was calculated by taking a percent of a discharge capacity compared to a charge capacity.

TABLE 3

| Sample | Initial efficiency (%) |
| --- | --- |
| Example 4 | 87.2 |
| Comparative Example 1 | 80.5 |

As shown in Table 3, it may be seen that the anode of Example 4 had an improved initial efficiency compared with that of the anode of Comparative Example 1.

Evaluation Example 6: Lifespan Characteristics 60 cycles of charging/discharging were performed on the full-cells prepared in Example 2 and Comparative Examples 1 and 3 at a 1 C rate to evaluated lifespan characteristics of the cells, and the results are shown in FIG. 5.

Figure 5:
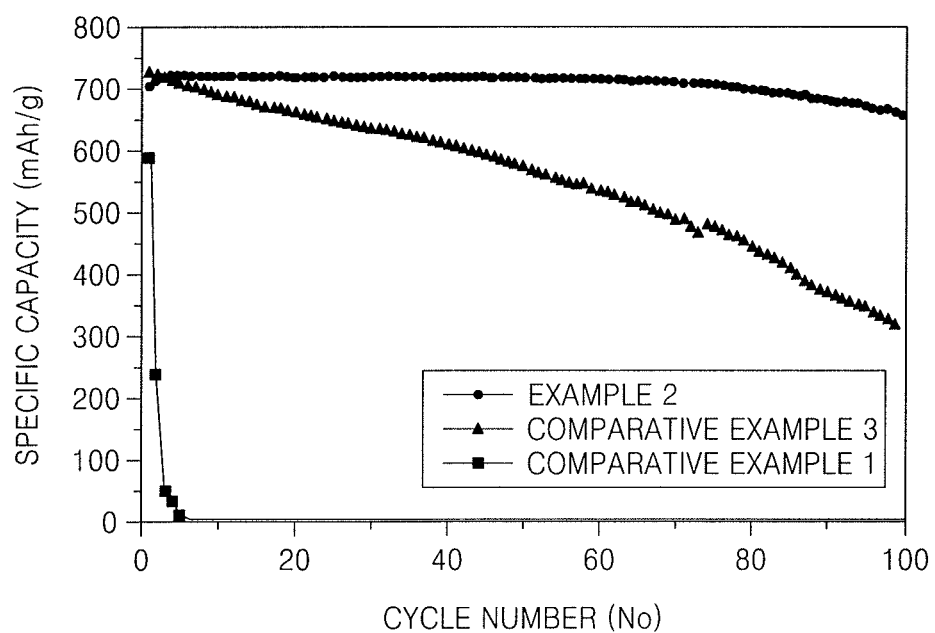
FIG. 5 illustrates lifespan characteristics of full-cell batteries prepared in Example 4, Comparative Example 1, and Comparative Example 3.

As shown in FIG. 5, it may be seen that the half-cell of Example 2 had an improved initial efficiency compared with those of the half-cells of Comparative Examples 1 and 3.

Evaluation Example 7: Expansion Ratio 60 cycles of charging/discharging were performed on the full-cells prepared in Example 4 and Comparative Example 3 at a 1 C rate. Expansion ratios of the cells before and after the 60 cycles of charging were evaluated, and the results are shown in Table 4.

Here, the expansion ratio was calculated according to Equation 1.

Expansion ratio=(Thickness of electrode plate after 0.1 C charging–thickness of electrode before charging)/thickness of electrode before charging*100   Equation 1

TABLE 4

| Sample | Expansion ratio (%) |
|---|---|
| Example 4 | 43.5 |
| Comparative Example 3 | 48.5 |

As shown in Table 4, it may be seen that the half-cell of Example 4 had an improved expansion ratio compared with that of the half-cell of Comparative Example 3.

By way of summation and review, a capacity of a carbonaceous material may be low since an energy density per unit volume of an electrode plate of the carbonaceous material may not be satisfactory, and side reactions with an organic electrolyte solution used in a high discharge voltage could occur.

An anode active material may be the carbonaceous material including artificial or natural graphite or hard carbon capable; silicon, tin, or germanium which are alloyable with lithium having a high theoretical capacity density; or an oxide or an alloy thereof. A silicon-based material in the anode active material may have a high charge capacity and thus may be used in a high capacity. A volume change could occur in the silicon-based material during a charge/discharge process, and charge/discharge characteristics and lifespan characteristics of the battery could deteriorate.

As described above, according to one or more embodiments, an electrode with improved adhesion between an electrode and an active material and between active materials may be prepared. When the electrode is used, a lithium secondary battery with improved lifespan, initial efficiency, and stability may be manufactured.

The embodiments may provide a binder composition for a lithium secondary battery that may effectively control a volume change of an electrode active material.

The embodiments may provide a lithium secondary battery with improved lifespan and capacity characteristics by including the electrode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A binder composition for a lithium secondary battery, the binder composition comprising an interpenetrating network structure that includes:

a cyclic polymer, the cyclic polymer including a repeating unit represented by Formula 1 or a repeating unit represented by Formula 2; and a copolymer, the copolymer including a repeating unit represented by Formula 3 and a repeating unit represented by Formula 4, wherein an amount of the repeating unit represented by Formula 3 is about 40 mol % to about 70 mol %, based on a total amount of the copolymer:

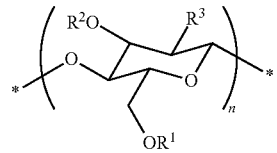

Formula 1

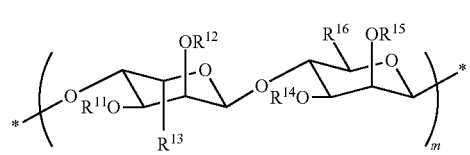

Formula 2 wherein, in Formulae 1 and 2, $R^1$, $R^2$, $R^{11}$, $R^{12}$, $R^{14}$, and $R^{15}$ are each independently a hydrogen atom, a substituted or unsubstituted C1-C5 alkyl group, a substituted or unsubstituted C2-C5 alkenyl group, a substituted or unsubstituted C2-C5 alkynyl group, or $-(CH_2)_p-COOX^1$, in which p is an integer of 1 to 5 and $X^1$ is an alkali metal, $R^3$, $R^{13}$, and $R^{16}$ are each independently $-OR^4$, $-NHR^5$, or $-COOX^2$, $R^4$ is a hydrogen atom, a substituted or unsubstituted C1-C5 alkyl group, a substituted or unsubstituted C2-C5 alkenyl group, a substituted or unsubstituted C2-C5 alkynyl group, or $-(CH_2)_p-COOX^1$, in which p is an integer of 1 to 5 and $X^1$ is an alkali metal, $R^5$ is a hydrogen atom or $-COCH_3$, $X^2$ is an alkali metal, and n and m are each independently an integer of 5 to 20,000,

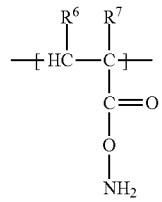

Formula 3 wherein, in Formula 3, $R^6$ and $R^7$ are each independently a hydrogen atom, a substituted or unsubstituted C1-C20 alkyl group, a substituted or unsubstituted C2-C5 alkenyl group, or a substituted or unsubstituted C2-C5 alkynyl group, Formula 4

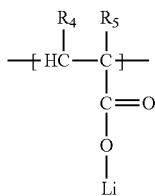

wherein, in Formula 4, R₄ and R₅ are each independently a hydrogen atom, a substituted or unsubstituted C1-C20 alkyl group, a substituted or unsubstituted C2-C5 alkenyl group, or a substituted or unsubstituted C2-C5 alkynyl group.

2. The binder composition as claimed in claim 1, wherein a molar ratio of the cyclic polymer and the copolymer is about 1:9 to about 5:5.

3. The binder composition of claim 1, wherein the copolymer including the repeating unit represented by Formula 3 and the repeating unit represented by Formula 4 is a copolymer represented by Formula 5:

Formula 5

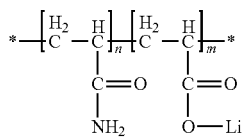

wherein, in Formula 5, n is about 0.4 to about 0.7, and m is about 0.3 to about 0.6.

4. The binder composition as claimed in claim 1, wherein the cyclic polymer includes a repeating unit represented by one of Formulae 3-1 to 3-6:

Formula 3-1

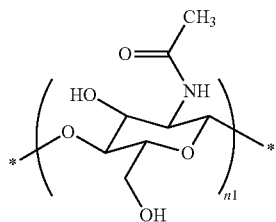

Formula 3-2

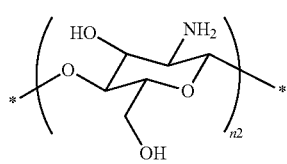

Formula 3-3

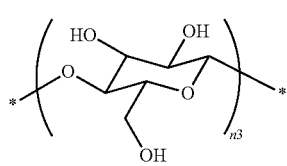

Formula 3-4

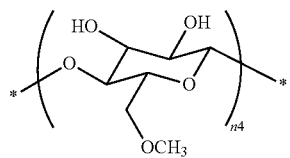

Formula 3-5

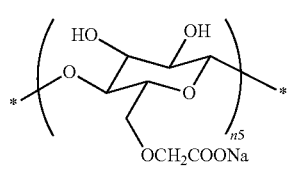

Formula 3-6

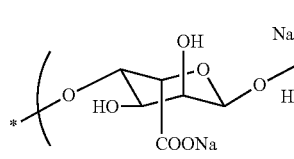

wherein, in Formulae 3-1 to 3-6, n1 to n5 and m1 are each independently an integer of 5 to 20,000.

5. The binder composition as claimed in claim 1, wherein a weight average molecular weight of the copolymer is about 700,000 g/mol to about 900,000 g/mol.

6. The binder composition as claimed in claim 1, wherein a weight average molecular weight of the cyclic polymer is about 2,000 g/mol to about 2,000,000 g/mol.

7. The binder composition as claimed in claim 1, wherein a pH of the binder composition is about 6.0 to about 8.0.

8. An electrode for a lithium secondary battery, the electrode comprising:
an electrode active material; and
the binder composition as claimed in claim 1.

9. The electrode as claimed in claim 8, wherein the electrode active material includes Si, SiO$_x$, in which 0<x<2, a Si—C composite, a Si-Q alloy, in which Q is an alkali metal, an alkaline-earth metal, an element of Group 13 to Group 16, a transition metal, a rare-earth element, or a combination thereof, but not Si, graphite, or a combination thereof.

10. The electrode as claimed in claim 8, wherein a molar ratio of the cyclic polymer and the copolymer is about 1:9 to about 5:5.

11. The electrode as claimed in claim 8, wherein the copolymer including the repeating unit represented by Formula 3 and the repeating unit represented by Formula 4 is a copolymer represented by Formula 5:

Formula 5

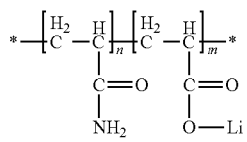

wherein, in Formula 5, n is about 0.4 to about 0.7, and m is about 0.3 to about 0.6.

12. The electrode as claimed in claim 8, wherein the cyclic polymer includes a repeating unit represented by one of Formulae 3-1 to 3-6:

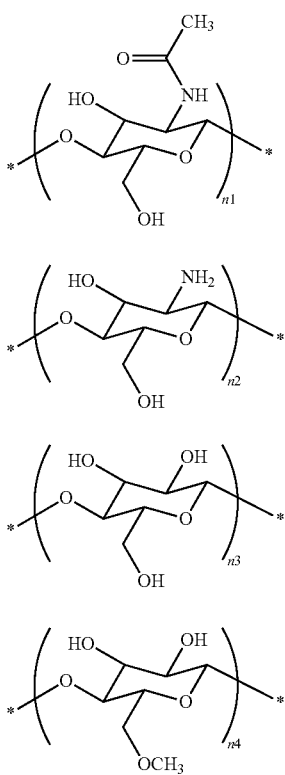

Formula 3-1

Formula 3-2

Formula 3-3

Formula 3-4

Formula 3-5

Formula 3-6 wherein, in Formulae 3-1 to 3-6, n1 to n5 and m1 are each independently an integer of 5 to 20,000.

13. The electrode as claimed in claim 8, wherein a weight average molecular weight of the copolymer is about 700,000 g/mol to about 900,000 g/mol.

14. The electrode as claimed in claim 8, wherein a weight average molecular weight of the cyclic polymer is about 2,000 g/mol to about 2,000,000 g/mol.

15. The electrode as claimed in claim 8, wherein a pH of the binder composition is about 6.0 to about 8.0.

16. A lithium secondary battery, comprising:
a cathode;
an anode; and
an electrolyte,
wherein at least one of the cathode and the anode is the electrode as claimed in claim 8.

* * * * *